(12) United States Patent
Adkins et al.

(10) Patent No.: US 7,002,266 B1
(45) Date of Patent: Feb. 21, 2006

(54) ACTIVE DC OUTPUT CONTROL AND METHOD FOR DC/DC CONVERTER

(75) Inventors: Kenneth C. Adkins, Fremont, CA (US); Theodore Martin Myers, Los Altos, CA (US); John Tabler, San Jose, CA (US); Anurag Kaplish, Mountain View, CA (US); Thomas J. O'Obrien, Campbell, CA (US)

(73) Assignee: Summit Microelectronics, San Jose, CA (US)

( * ) Notice: Subject to any disclaimer, the term of this patent is extended or adjusted under 35 U.S.C. 154(b) by 281 days.

(21) Appl. No.: 10/294,842

(22) Filed: Nov. 13, 2002

(51) Int. Cl.
*H02M 3/16* (2006.01)

(52) U.S. Cl. .................... 307/151; 323/266

(58) Field of Classification Search .............. 713/300; 323/266, 282, 283, 285; 307/151
See application file for complete search history.

(56) References Cited

U.S. PATENT DOCUMENTS

| | | | | |
|---|---|---|---|---|
| 5,101,335 | A * | 3/1992 | Ludden et al. | 363/21.17 |
| 5,724,237 | A * | 3/1998 | Hunter | 363/65 |
| 5,838,557 | A * | 11/1998 | Wood | 363/60 |
| 6,005,373 | A * | 12/1999 | Snodgrass et al. | 323/266 |
| 6,081,436 | A * | 6/2000 | Lin | 363/65 |
| 6,110,213 | A * | 8/2000 | Vinciarelli et al. | 703/1 |
| 6,141,762 | A * | 10/2000 | Nicol et al. | 713/300 |
| 6,353,310 | B1 * | 3/2002 | Wang | 323/285 |
| 6,512,472 | B1 * | 1/2003 | Smith et al. | 341/155 |
| 6,525,516 | B1 * | 2/2003 | Schultz et al. | 323/282 |
| 6,600,298 | B1 * | 7/2003 | McDonald et al. | 323/271 |
| 6,717,434 | B1 * | 4/2004 | Takahashi et al. | 326/37 |
| 2003/0234635 | A1 * | 12/2003 | Currelly et al. | 323/268 |

OTHER PUBLICATIONS

"First Generation Converters and Accessory Modules," Vicor Application Manual, Eighth Edition, Apr., 2001, Chapters 5 and 9.*
Vicor Power Data Sheet for VI-200 DC-DC Converters, pp. 1–2, no date available.*
Vicor Power Data Sheet for VI-J00 DC-DC Converters, pp. 1–2, no date available.*

* cited by examiner

*Primary Examiner*—Brian Sircus
*Assistant Examiner*—Brett Squires
(74) *Attorney, Agent, or Firm*—Fernandez & Associates (57) ABSTRACT

A control loop system is provided that employs an active DC output control circuit that more accurately calibrates the desire voltage at a load, e.g. 3.3 volts, by adjusting a trim pin on a DC/DC converter. In a first embodiment, an active DC output control circuit calibrates a DC/DC converter that is connected to a single load. In a second embodiment, an active DC output control circuit calibrates multiple DC/DC converters that are connected to multiple loads.

32 Claims, 6 Drawing Sheets

ACTIVE DC OUTPUT CONTROL AND METHOD FOR DC/DC CONVERTER

BACKGROUND INFORMATION

1. Field of the Invention

The invention relates generally to integrated circuits, and more particularly to controlling a voltage in a DC/DC converter.

2. Description of Related Art

Conventional DC/DC converters have a pin available that allows the adjustment of the supply output. When this pin is left unconnected, the voltage output will be at the nominal setting for the converter within a certain tolerance set by the manufacturer. During testing of a system using these converters, it is common to run tests at this nominal voltage and at a lower and a higher voltage to ensure that the components being powered by the converter are not marginal. This is generally accomplished by placing a is resistor between the supply output and the trimming pin or the trimming pin and ground.

The value of the resistor will determine the voltage difference between nominal and the test voltage.

At the conclusion of a test, the trimming pin is left unconnected. The problems with this approach are: the nominal voltage output may not be as accurate as the system requires, changing the voltage difference for testing requires a resistor change, the accuracy of the output voltage is unknown due to the difficulty in obtaining exact resistor values and the unknown nominal output value of the converters, and switches are required to connect and disconnect the resistors. The resistors and switches are duplicated for each DC/DC converter in a system.

Accordingly, it is desirable to have a system and method for precisely controlling the voltage at the output of a DC/DC converter.

SUMMARY OF THE INVENTION

The present invention provides a control loop system that employs an active DC output control circuit which accurately calibrates the desired voltage at the output of a DC/DC converter or an input into a load, e.g. 3.3 volts, by adjusting a trim pin feeding into the DC/DC converter. In a first embodiment, an active DC output control circuit calibrates a DC/DC converter that is connected to a single load. In a second embodiment, an active DC output control circuit calibrates multiple DC/DC converters that drive multiple loads.

Advantageously, the present invention enables a system to achieve a desired voltage at the load within a narrow voltage margin. A non-volatile memory in the active DC output control circuit stores multiple values of desired output voltages including nominal and test values.

This summary does not purport to define the invention. The invention is defined by the claims.

DETAILED DESCRIPTION OF PREFERRED EMBODIMENTS

Figure 1:
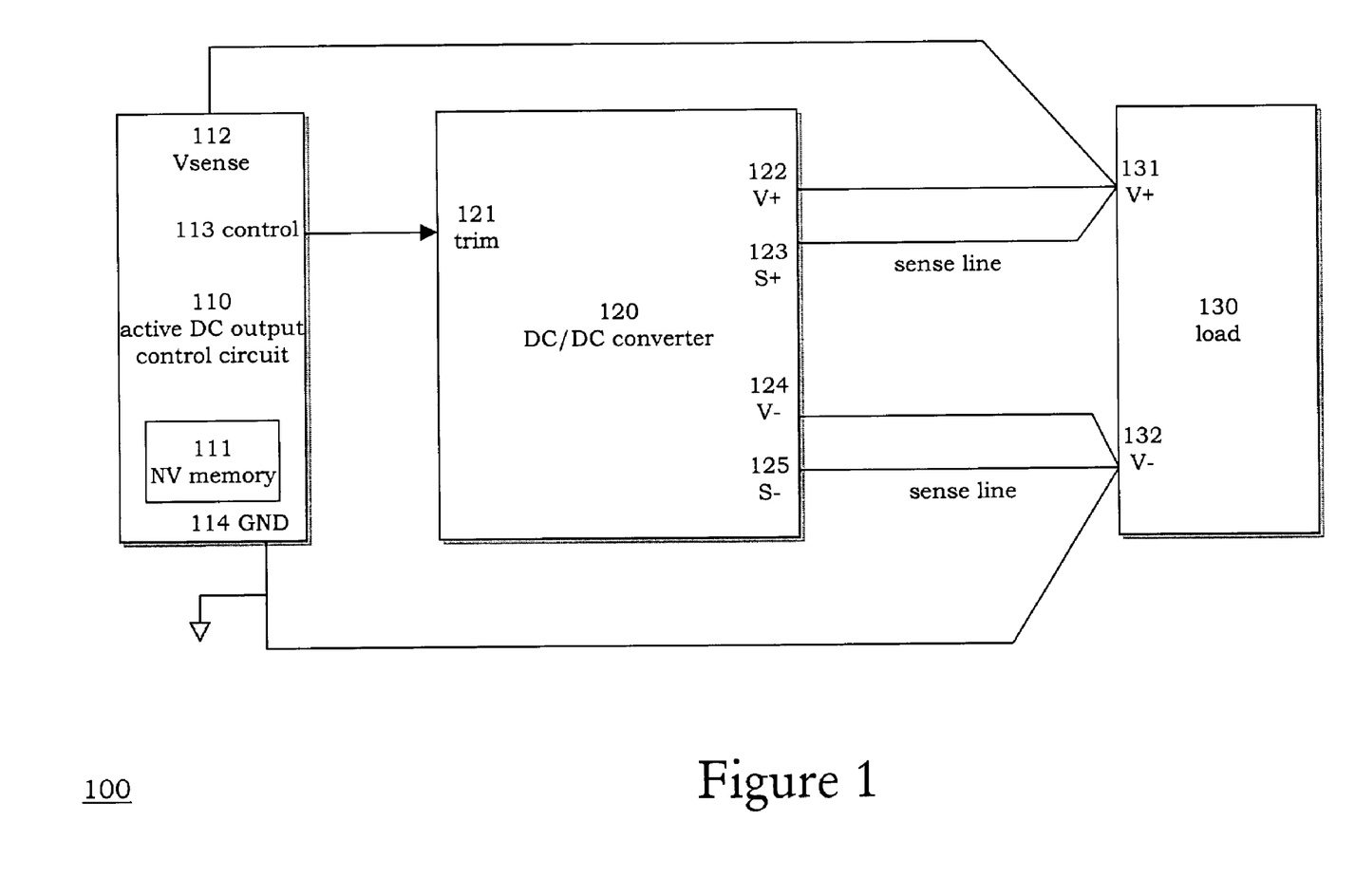
FIG. 1 is an architectural diagram illustrating a first embodiment of a control loop system that employs an active DC output control for a single load in accordance with the present invention.

Referring now to FIG. 1, there is shown an architectural diagram illustrating a first embodiment of a control loop system 100 with an active DC output control for a single load. The control loop system 100 comprises an active DC output control circuit 110 having a NV (non-volatile) memory 111, which in turn is connected to a DC/DC converter 120, which in turn is connected to a single port load 130. A control pin 113 from the active DC output control circuit 110 is connected to an input trim pin 121 of the DC/DC converter 120. At a V+ input 131 of the load 130, the V+ input 131 is commonly connected to a Vsense 112 of the active DC output control circuit 110, a V+ 122 of the DC/DC converter 120, and a S+ 123 of the DC/DC converter 120. At a V− input 132 of the load 130, the V− input 132 is commonly connected to a ground 114 of the active DC output control circuit 110, a V− 124 of the DC/DC converter 120, and a S− 125 of the DC/DC converter 120. An objective of the control loop system 100 is to precisely regulate the voltage difference between V+ 131 and V− 132 at the load 130. One of ordinary skill in the art should recognize that the load 130 can be either a single load or multiple loads, which is shown and further described with respect to FIG. 2.

Figure 2:
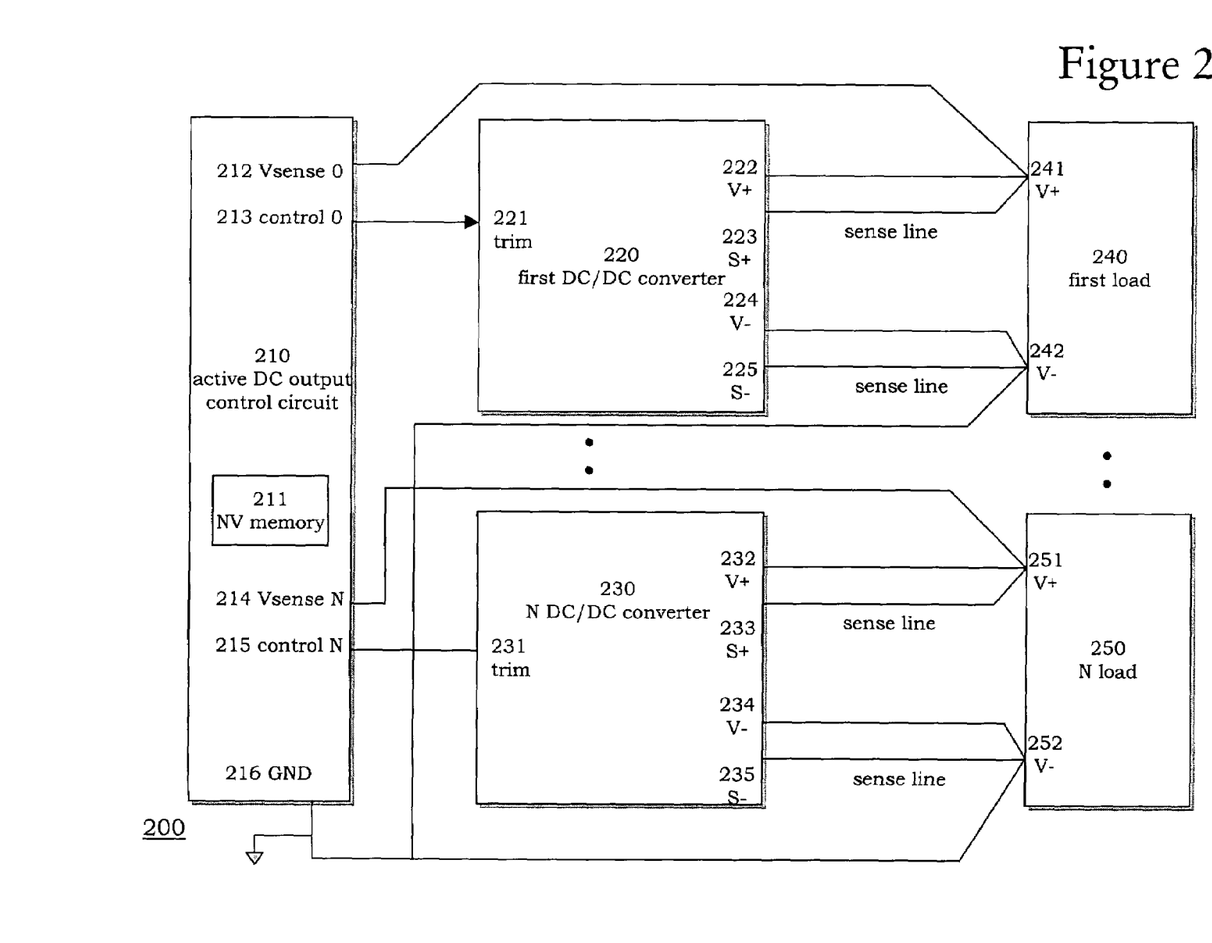
FIG. 2 is an architectural diagram illustrating a second embodiment of a control loop system that employs an active DC output control for multiple loads in accordance with the present invention.

Turning now to FIG. 2, there is shown an architectural diagram illustrating a second embodiment of a control loop system 200 that employs an active DC output control for multiple port loads. The control loop system 200 comprises an active DC output control circuit 210 having a NV memory 211 and having multiples trim pins: a control pin 0 213 through a control pin N 215. The control pin 0 213 from the active DC output control circuit 210 is connected to a trim pin 221 of a first DC/DC converter 220, which in turn has a set of V+ 222 and S+ 223 pins that are connected to a V+ 241 pin in a first load 240, and a set of V− 224 and S− 225 coupled to a V− 242 pin in the first load 240. The control pin N 215 from the active DC output control circuit 210 is coupled to a trim pin 231 in N DC/DC converter 230, which in turn has a set of V+ 232 and S+ 233 pins connected to a V+ 251 pin of N load 250, and a set of V− 234 and S− 235 connected to a V− 252 pin in the N load 250. As shown in FIG. 2, additional DC/DC converters can be added between the first DC/DC converter 220 and the N DC/DC converter 230, as well as additional loads can be added between the first load 240 and the N load 250. The active DC output control circuit 210 has a Vsense 0 212 coupled to the V+ 241 of the first load 240, a Vsense N 214 coupled to the V+ 251 of the N load 250, and a ground 216 coupled commonly to the first load 240 and the N load 250. The active DC output control circuit 210 uses the control 0 pin 213 to precisely regulate the V+ 241 input at the first load 240, and uses the control N pin 213 to precisely regulate the V+ 251 input at the N load 250. Additional trim pins in the active DC output control circuit 210 can be added to precisely regulate additional DC/DC converters and loads.

For example, if the control loop system 200 uses a 3.3V DC/DC converter in the first DC/DC converter 220 and a 2.5V DC/DC converter in the N DC/DC converter 230, the user may need to test all load components with those supplies raised by 5%. The control loop system 200 measures the voltage output V+ 241 generated from the 3.3V DC/DC converter 220, compared with a first reference voltage, and adjusts the voltage output slightly upward by adjusting the voltage on the control pin 0 213. The control loop system 200 then switches to the 2.5V DC/DC converter in the N DC/DC converter 230 and performs the same operation. This is repeated until both supplies are at the desired output levels of nominal plus 5%. The control loop system 200 then maintains the is desired output level. If the voltage output V+ 241 drifts higher or lower, the control loop system 200 senses the change and makes slight adjustments to the trim pin until the output is back at the set point. When the testing has completed, the control circuit can be disconnected to allow the DC/DC converter to return to its nominal output. Alternatively, the control circuit can be re-programmed to the desired nominal output values for the converters and left connected to the trim pins. This can provide a more accurate DC output level then the converter would normally provide.

Figure 3A:
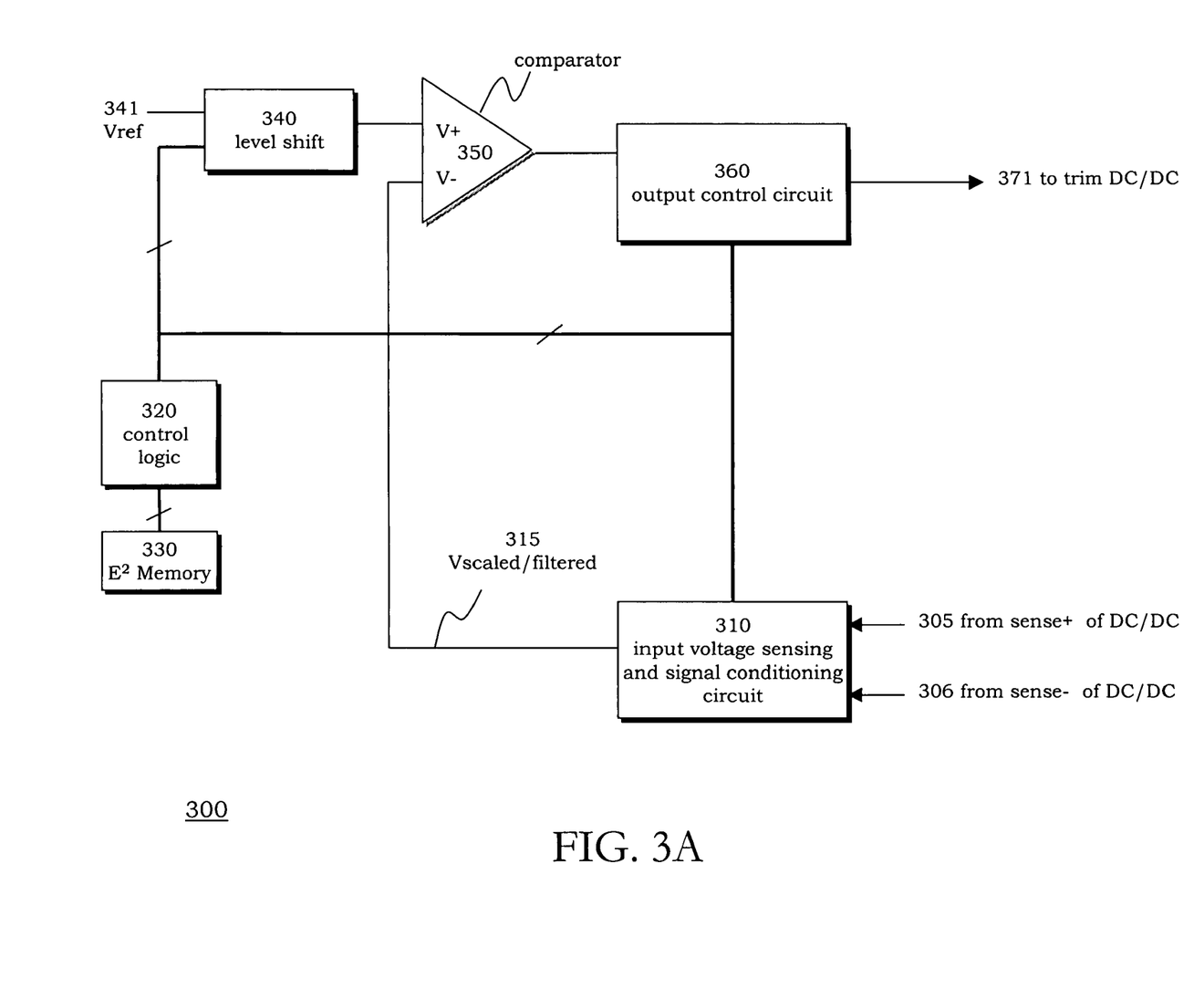
FIG. 3A is more detailed block diagram illustrating the control loop system 100 with an active DC output control for a single load in accordance with the present invention.
Figure 3B:
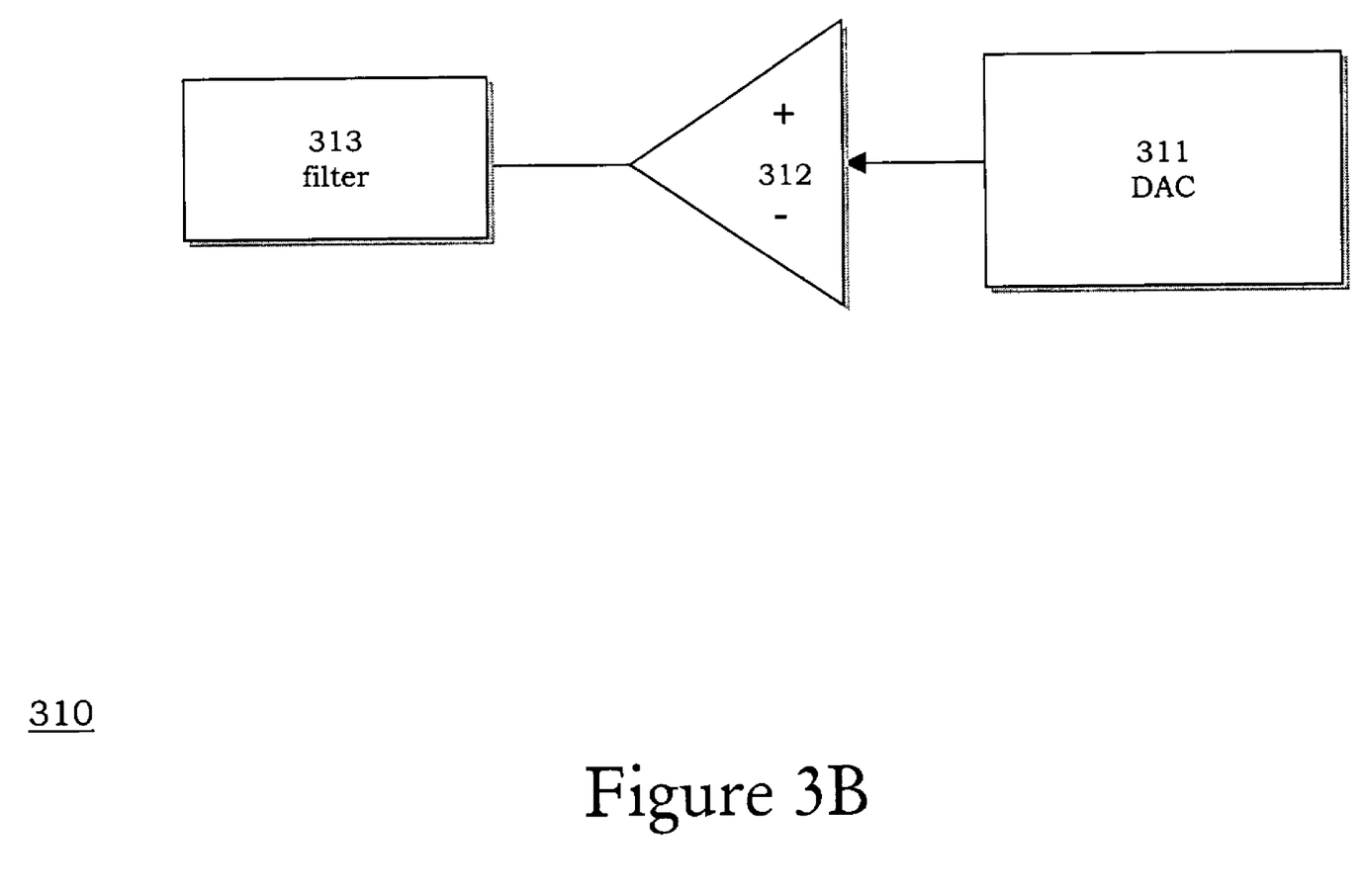
FIG. 3B is a circuit diagram of the input voltage sensing and signal conditioning circuit in accordance with the present invention.

FIG. 3A is a more detailed block diagram 300 illustrating the control loop system 100 with an active DC output control for a single load. An input voltage sensing and signal conditioning circuit 310 comprises a digital-analog-converter DAC circuit 311, coupled to a unity gain amplifier 312, and a filter 313, as shown in FIG. 3B. The input voltage sensing and signal conditioning circuit 310 receives a sense+ signal 305 and a sense− signal 306 into the DAC 311, transmits the sense+ signal 305 and the sense− signal 306 to the unity gain amplifier 312, and filters the sense+ signal 305 and the sense− signal 306 through the filter 313. The input voltage sensing and signal conditioning circuit 310 generates a scaled/filtered (Vscaled/filtered) signal 315 to a comparator 350. The comparator 350 compares the scaled/filtered (Vscaled/filtered) signal 315 with a reference (Vref) signal 341 that propagates through a Vref level shifter 340 into the comparator 350.

If the DC/DC converter 120 has a positive polarity and the Vref 341 signal is greater than the $V_{scaled/filtered}$ signal 315, the active DC output control circuit 110 adjusts the voltage on the DC/DC control pin 113 slightly upward to increase the output voltage. If the DC/DC converter 120 has a positive polarity and the $V_{ref}$ 341 signal is less than the $V_{scaled/filtered}$ signal 315, the active DC output control circuit 110 adjusts the voltage on the DC/DC control pin 113 slightly downward to decrease the output voltage. If the DC/DC converter 120 has a negative polarity and the $V_{ref}$ 341 signal is greater than the $V_{scaled/filtered}$ signal 311, the active DC output control circuit 110 adjusts the voltage on the DC/DC control pin 113 slightly downward to increase the output voltage. If the DC/DC converter 120 has a negative polarity and the $V_{ref}$ 341 signal is less than the $V_{scaled/filtered}$ signal 315, the active DC output control circuit 120 adjusts the voltage on the DC/DC control pin 113 slightly upward to decrease the output voltage.

A control logic 320 allows the user to interface with the active DC output control circuit 110. In addition, the control logic 320 controls data going to the DAC 311 and the Vref level shifter 340. Furthermore, the control logic 320 controls the sequence of events that occurs in the active DC output control circuit 110. The control logic 320 is coupled to a NV memory 330 that stores the data for the DAC 311 and Vref level shifter 340.

An output control circuit 360 is connected to the comparator 350 for increasing or decreasing the voltage output using the results of the comparator 350. The output control circuit 360 generates an output signal 371 to trim the DC/DC voltage at the load 130. The output signal 371 generated by the output control circuit 360 can be either a voltage signal or current signal.

Figure 4:
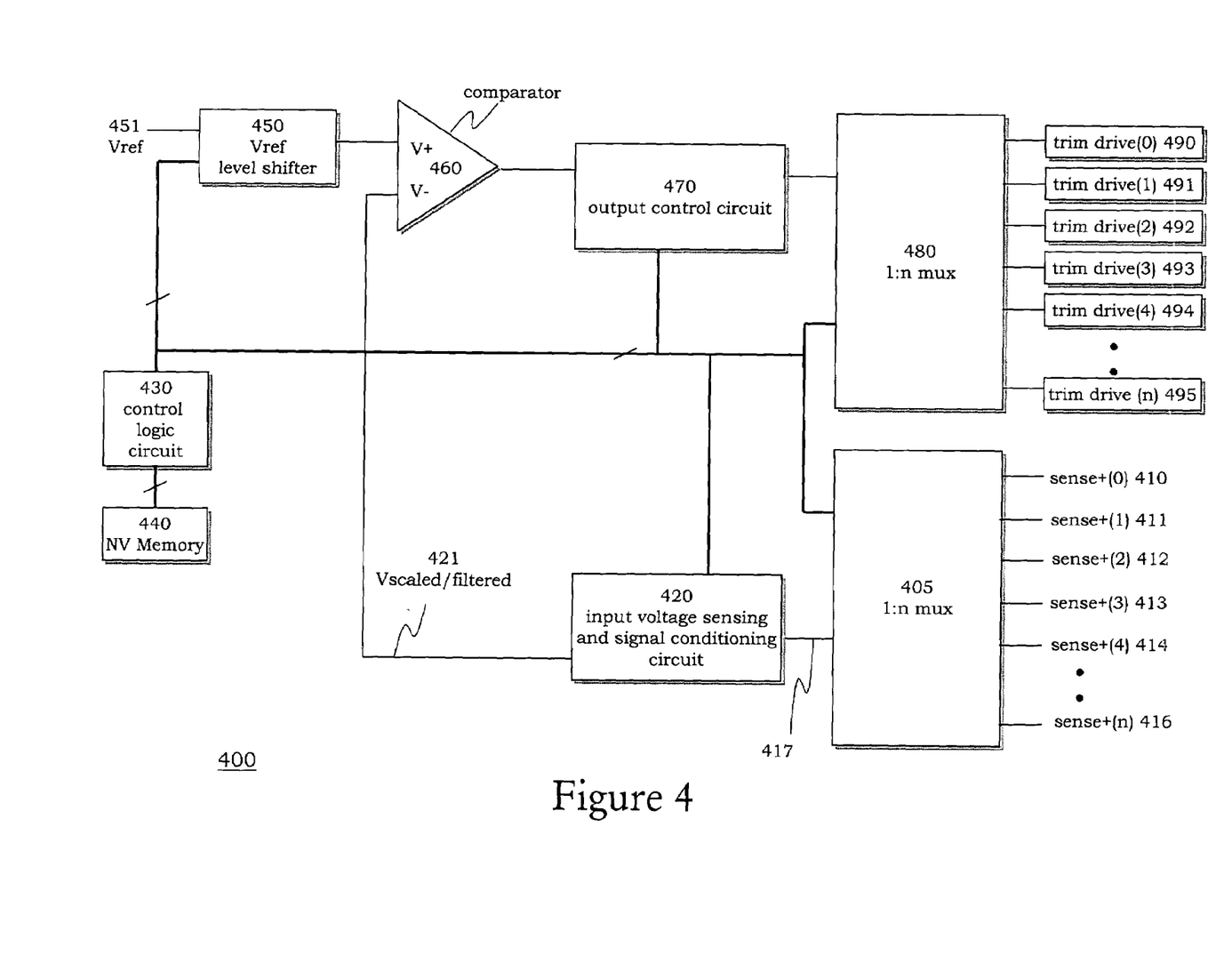
FIG. 4 is a more detailed block diagram illustrating the control loop system 200 with an active DC output control for multiple loads in accordance with the present invention.

FIG. 4 is a more detailed block diagram 400 illustrating the control loop system 200 with an active DC output control for multiple loads. A 1:n mux 405 multiplexes multiple sense signals ranging from a sense+(0) 410 signal, a sense+(1) 411 signal, a sense+(2) 412 signal, a sense+(3) 413 signal, a sense+(4) 414 signal, . . . a sense+(n) 415 signal into an input voltage sensing and signal conditioning circuit 420. The input voltage sensing and signal conditioning circuit 420 comprises the digital-analog-converter DAC circuit 311, coupled to the unity gain amplifier 312, and the filter 313, as shown in FIG. 3B. The 1:n mux 405 generates an output signal 417 from a selected signal among the sense+(1) 411 signal, the sense+(2) 412 signal, the sense+(3) 413 signal, the sense+(4) 414 signal, or the sense+(n) 415 to the input voltage sensing and signal conditioning circuit 420. The input voltage sensing and signal conditioning circuit 420 processes the signal 417 through the DAC 311, the unity gain amplifier 312, the filter 313, and generates a scaled/filtered (Vscaled/filtered) signal 421. A comparator 460 receives the scaled/filtered signal 421 from the input voltage sensing and signal conditioning circuit 420 and compares with a reference (Vref) signal 451 that propagates through a Vref level shifter 450 into the comparator 460.

If the DC/DC converter 220 has a positive polarity and the $V_{ref}$ 451 signal is greater than the $V_{scaled/filtered}$ signal 421, the active DC output control circuit 210 adjusts the voltage on the DC/DC control pin 213 slightly upward to increase the output voltage. If the DC/DC converter 220 has a positive polarity and the $V_{ref}$ 451 signal is less than the $V_{scaled/filtered}$ signal 421, the active DC output control circuit 210 adjusts the voltage on the DC/DC control pin 213 slightly downward to decrease the output voltage. If the DC/DC converter 220 has a negative polarity and the $V_{ref}$ 451 signal is greater than the $V_{scaled/filtered}$ signal 421, the active DC output control circuit 210 adjusts the voltage on the DC/DC control pin 213 slightly downward to increase the output voltage. If the DC/DC converter 220 has a negative polarity and the $V_{ref}$ 451 signal is less than the $V_{scaled/filtered}$ signal 421, the active DC output control circuit 210 adjusts the voltage on the DC/DC control pin 213 slightly upward to decrease the output voltage.

A control logic 430 allows the user to interface with the active DC output control circuit 210. In addition, the control logic 430 controls data going to the DAC 311 and the Vref level shifter 450. Furthermore, the control logic 430 controls the sequence of events that occurs in the active DC output control circuit 210. The control logic 430 is coupled to a NV (non-volatile) memory 440 that stores the data for the DAC 311 and Vref level shifter 450.

An output control circuit 470 is connected to the comparator 460 for increasing or decreasing the voltage output using the results of the comparator 460. A 1:n mux 460 selects the appropriate trim drive among a trim drive(0) 490, a trim drive(1) 491, a trim drive(2) 492, a trim drive(3) 493, a trim drive(4) 494, a trim drive(n) 495.

Figure 5:
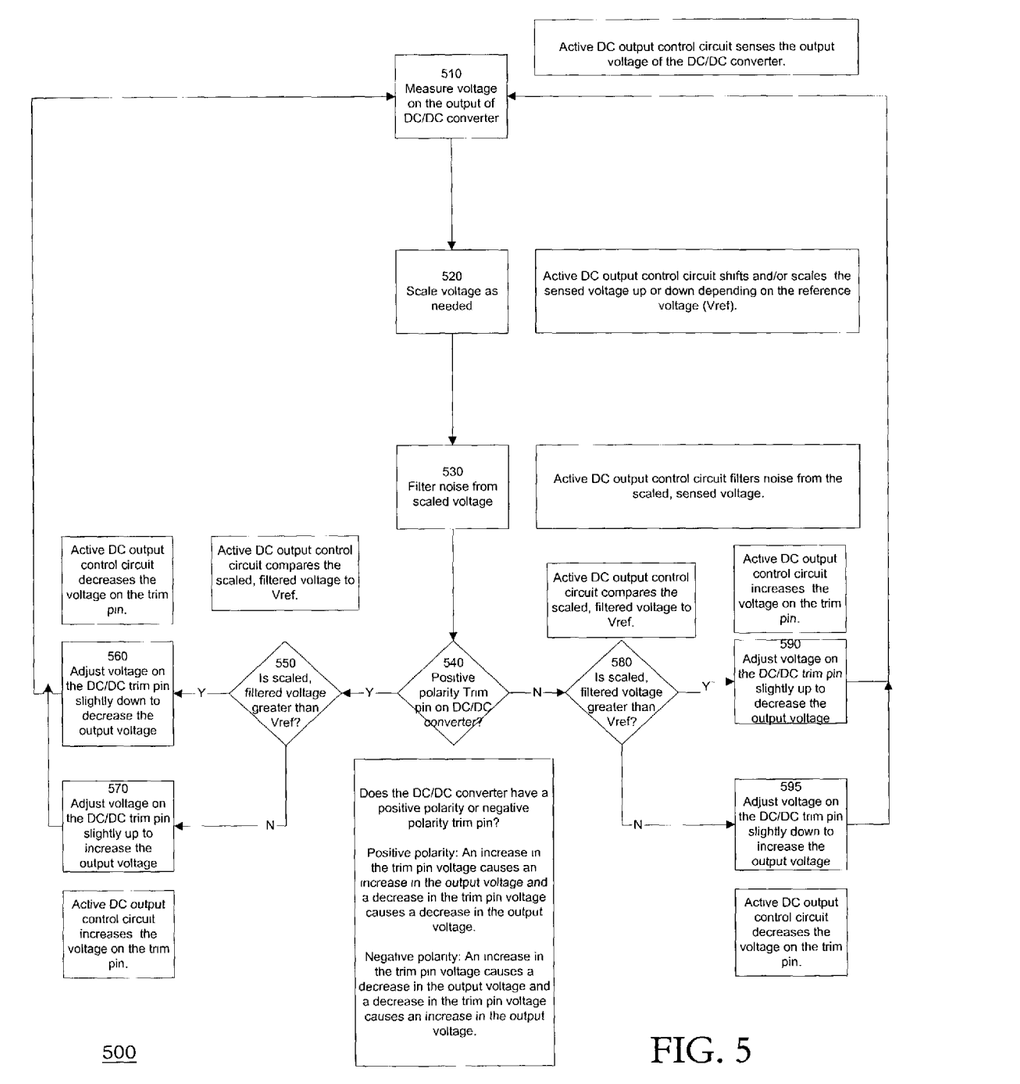
FIG. 5 is a flow diagram illustrating the process for monitoring an active DC output control loop in accordance with the present invention.

FIG. 5 is a flow diagram 500 illustrating the process for actively controlling the DC output of a DC/DC converter. The active DC output control circuit 110 senses the output voltage V+ 131 and V− 132 of the DC/DC converter 120 and measures 510 the output voltage V+ 131 and V− 132 of the DC/DC converter 120. At step 520, the active DC output control circuit 110 shifts and/or scales the sensed voltage upward or downward depending on the value of the reference voltage Vref 341. The active DC output control circuit 110 filters 530 noise from the scaled sensed voltage. At step 540, the active DC output control circuit 110 will react differently depending on whether the trim pin 121 on the DC/DC converter 120 has a positive polarity or a negative polarity. If the trim pin 121 has a positive polarity, an increase in the trim pin voltage causes an increase in the output voltage and a decrease in the trim pin voltage causes a decrease in the output voltage. If the trim pin 121 has a negative polarity, an increase in the trim pin voltage causes a decrease in the output voltage and a decrease in the trim pin voltage causes an increase in the output voltage.

In the scenario where the trim pin 121 has a positive polarity, the active DC output control circuit 110 determines 550 if the scaled and filtered voltage is greater than the Vref 341 by comparing the scaled and filtered voltage to the Vref 341. If the scaled and filtered voltage is greater than the Vref 341, the active DC output control circuit 110 decreases 560 the voltage on the control pin 113, thereby adjusting the voltage on the DC/DC trim pin slightly downward to decrease the output voltage. If the scaled and filtered voltage is less than the Vref 341, the active DC output control circuit 110 increases the voltage on the control pin 113, thereby adjusting 570 the voltage on the DC/DC trim pin slightly upward to increase the output voltage.

In the scenario where the trim pin 121 has a negative polarity, the active DC output control circuit 110 determines 580 if the scaled and filtered voltage is greater than the Vref 341 by comparing the scaled and filtered voltage to the Vref 341. If the scaled and filtered voltage is greater than the Vref 341, the active DC output control circuit 110 increases 590 the voltage on the control pin 113, thereby adjusting the voltage on the DC/DC trim pin slightly upward to decrease the output voltage. If the scaled and filtered voltage is less than the Vref 341, the active DC output control circuit 110 decreases the voltage on the control pin 113, thereby adjusting 595 the voltage on the DC/DC trim pin slightly downward to increase the output voltage. As apparent to one of ordinary skill in the art, the method described in FIG. 5 is also applicable to the control loop system 200 with multiple DC/DC converters and multiple loads wherein a first target voltage output is chosen for a first of N DC/DC converters and a second target voltage output is chosen is for a second of N DC/DC converters.

The above embodiments are only illustrative of the principles of this invention and are not intended to limit the invention to the particular embodiments described. For example, although the term "load" or "loads" are used, one of ordinary skill in the art should recognize that other similar or equivalent terms can be used without departing from the spirit of the present invention. Moreover, it is apparent to one skilled in the art that various types of NV memories can be used, such as an $E^2$ memory, without departing from the spirit of the present invention. Accordingly, various modifications, adaptations, and combinations of various features of the described embodiments can be practiced without departing from the scope of the invention as set forth in the appended claims.

We claim:

1. A system for a single load, comprising:
an active DC output control circuit;
a DC/DC converter having a trim pin and coupled to the active DC output control circuit; and
a load, coupled to the DC output control circuit and the DC/DC converter, the DC/DC converter generating a DC/DC output voltage level to the load;
wherein the DC output control circuit comprises an input voltage sensing and signal conditioning circuit;
wherein the input voltage sensing and signal conditioning circuit comprises a digital analog converter for scaling the DC/DC output voltage level based on a digital scaling factor without the use of analog to digital converter and a digital processor;
wherein the active DC output control circuit drives the trim pin for calibrating the DC/DC output voltage level.

2. A system for a single load, comprising:
an active DC output control circuit;
a DC/DC converter having a trim pin and coupled to the active DC output control circuit; and
a load, coupled to the DC output control circuit and the DC/DC converter, the DC/DC converter generating a DC/DC output voltage level to the load;
wherein the DC output control circuit comprises an input voltage sensing and signal conditioning circuit;
wherein the input voltage sensing and signal conditioning circuit comprises a digital analog converter;
wherein the active DC output control circuit drives the trim pin for calibrating the DC/DC output voltage level;
wherein the active DC output control circuit comprises a NV (non-volatile) memory;
wherein the NV memory stores only data for maintaining the desired output voltage settings.

3. The system of claim 2, wherein the active DC output control circuit comprises:
a control logic, connected to the NV memory;
an input voltage sensing and signal conditioning circuit for receiving a V+ signal; and
a comparator, coupled to the input voltage sensing and signal conditioning circuit, for comparing a reference voltage and the V+ signal and generating a comparator output signal.

4. The system of claim 3, wherein input voltage sensing and signal conditioning circuit comprises the digital analog converter, an amplifier, and a filter.

5. The system of claim 4, further comprising a ground, coupled to the active DC output control circuit and the load.

6. A system for multiple loads, comprising:
an active DC output control circuit having a first of N control pins;
a first of N DC/DC converters, connected to the active DC output control circuit; and
a first of N loads, coupled to the DC output control circuit and the first of N DC/DC converters, the first of N DC/DC converters generating a DC/DC output voltage levels to the first of N loads;
wherein the DC output control circuit comprises an input voltage sensing and signal conditioning circuit;
wherein the input voltage sensing and signal conditioning circuit comprises a digital analog converter for scaling the DC/DC output voltage level based on a digital scaling factor without the use of analog to digital converter and a digital processor;

wherein the active DC output control circuit drives the first of N control pins for calibrating the DC/DC output voltage level for each load generated from the first of N DC/DC converters.

7. The system of claim 6, further comprising:
a second of N DC/DC converters, coupled to the active DC output control circuit; and
a second of N loads, coupled to the DC output control circuit and the second of N DC/DC converters, the second of N DC/DC converters generating a DC/DC output voltage level to the second of N loads;
wherein the active DC output control circuit drives a second trim pin for calibrating the DC/DC output voltage level generated from the second of N DC/DC converters.

8. The system of claim 7, further comprising a ground, coupled commonly to the first of N loads and the second of N loads.

9. The system of claim 6, wherein the active DC output control circuit comprises a NV (non-volatile) memory to maintain the desired output voltage settings.

10. The system of claim 9, wherein the active DC output control circuit comprises:
a control logic, coupled to the NV memory;
an input voltage sensing and signal conditioning circuit for receiving a V+ signal and a V− signal; and
a comparator, coupled to the input voltage sensing and signal conditioning circuit for comparing a reference voltage and the V+ signal, and generating a comparator output signal.

11. The system of claim 6, wherein the input voltage sensing and signal conditioning circuit comprises the digital analog converter, an amplifier, and a filter.

12. A method for calibrating a single load, comprising:
measuring an output voltage level from a DC/DC converter having a trim pin;
scaling the output voltage level using a digital analog converter based on a digital scaling factor without the use of analog to digital converter and a digital processor;
comparing the scaled output voltage level with a reference voltage;
adjusting the input signal of the DC/DC converter trim pin for calibrating the output voltage level with respect to the reference voltage.

13. The method of claim 12, further comprising, between the measuring step and the comparing step, adjusting the reference voltage using a level shifter.

14. The method of claim 12, further comprising, between the measuring step and the comparing step, filtering the output voltage level.

15. The method of claim 12, wherein in the comparing step, if the output voltage level is greater than the reference voltage and the DC/DC converter has a positive polarity, adjusting the first trim pin slightly downward to decrease the output voltage level.

16. The method of claim 12, wherein in the comparing step, if the output voltage level is less than the reference voltage and the DC/DC converter has a positive polarity, adjusting the first trim pin slightly upward to increase the output voltage level.

17. The method of claim 12, wherein in the comparing step, if the output voltage level is greater than the reference voltage and the DC/DC converter has a negative polarity, adjusting the first trim pin slightly upward to decrease the output voltage level.

18. The method of claim 12, wherein in the comparing step, if the output voltage level is less than the reference voltage and the DC/DC converter has a negative polarity, adjusting the first trim pin slightly downward to increase the output voltage level.

19. The method of claim 12, wherein the input signal of the DC/DC converter trim pin comprises a voltage signal.

20. The method of claim 12, wherein the input signal of the DC/DC converter trim pin comprises an electrical current signal.

21. A method for calibrating multiple loads, comprising:
measuring a first output voltage level from a first of N DC/DC converters having a first of N trim pins;
scaling the first output voltage level using a digital analog converter based on a digital scaling factor without the use of analog to digital converter and a digital processor;
comparing the scaled first output voltage level with a reference voltage;
adjusting the input signal of the first of N trim pins on the first of N DC/DC converters to calibrate the first output voltage level with respect to the reference voltage;
repeating the process for each of N DC/DC converters.

22. The method of claim 21, further comprising:
measuring a second output voltage level from a second of N DC/DC converters;
comparing the second output voltage level with a second reference voltage;
adjusting a first trim pin to calibrate the first output voltage level with respect to the second reference voltage.

23. The method of claim 21, further comprising, between the measuring step and the comparing step, scaling the each first output voltage level.

24. The method of claim 21, further comprising, between the measuring step and the comparing step, filtering the first output voltage level.

25. The method of claim 21, wherein in the comparing step, if the first output voltage level is greater than the first reference voltage and the DC/DC converter has a positive polarity, adjusting the first trim pin slightly downward to decrease the first output voltage level.

26. The method of claim 21, wherein in the comparing step, if the first output voltage level is less than the first reference voltage and the DC/DC converter has a positive polarity, adjusting the first trim pin slightly upward to increase the first output voltage level.

27. The method of claim 21, wherein in the comparing step, if the output voltage level is greater than the reference voltage and the DC/DC converter has a negative polarity, adjusting the first trim pin slightly upward to decrease the output voltage level.

28. The method of claim 21, wherein in the comparing step, if the first output voltage level is less than the first reference voltage and the DC/DC converter has a negative polarity, adjusting the first trim pin slightly downward to increase the first output voltage level.

29. The method of claim 21, wherein in the comparing step, if the second output voltage level is greater than the second reference voltage and the first of N DC/DC converters has a positive polarity, adjusting the second trim pin slightly downward to decrease the second output voltage level.

30. The method of claim 21, wherein in the comparing step, if the second output voltage level is less than the second reference voltage and the second of N DC/DC converters has a positive polarity, adjusting the second trim pin slightly upward to increase the second output voltage level.

31. The method of claim 21, wherein in the comparing step, if the second output voltage level is greater than the second reference voltage and the second of N DC/DC converters has a negative polarity, adjusting the second trim pin slightly upward to decrease the second output voltage level.

32. The method of claim 21, wherein in the comparing step, if the second output voltage level is less than the second reference voltage and the second of N DC/DC converters has a negative polarity, adjusting the second trim pin slightly downward to increase the second output voltage level.

* * * * *